Figure 1:
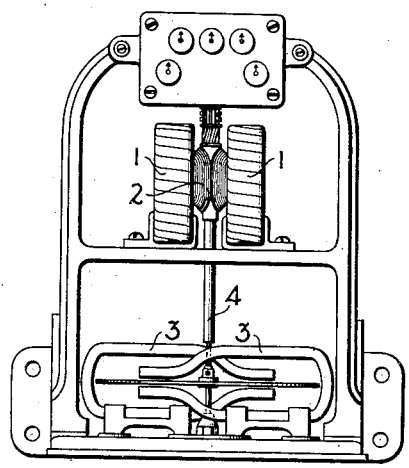

No. 779,822. PATENTED JAN. 10, 1905.
F. M. VOGEL.
BEARING FOR ELECTRIC METERS.
APPLICATION FILED JULY 13, 1903.

Witnesses.
Harry H. Tilden.
Helen Orford.

Inventor.
Frederick M. Vogel.
by Albert G. Davis
Att'y.

No. 779,822.

Patented January 10, 1905.

UNITED STATES PATENT OFFICE.

FREDERICK M. VOGEL, OF LYNN, MASSACHUSETTS, ASSIGNOR TO GENERAL ELECTRIC COMPANY, A CORPORATION OF NEW YORK.

BEARING FOR ELECTRIC METERS.

SPECIFICATION forming part of Letters Patent No. 779,822, dated January 10, 1905.

Application filed July 13, 1903. Serial No. 165,236.

*To all whom it may concern:*

Be it known that I, FREDERICK M. VOGEL, a citizen of the United States, residing at Lynn, in the county of Essex and State of Massachusetts, have invented certain new and useful Improvements in Bearings for Electric Meters, of which the following is a specification.

This invention relates to bearings for electric meters and similar delicate instruments. Its object is primarily to provide a bearing the life of which shall be longer than those heretofore used; and with this in view a further object is to minimize the friction and to maintain this minimum friction as nearly constant as possible.

It is obvious that in an electric meter the only wear is in the bearings, and the meter after being calibrated may be in use constantly without attention until the wear of the bearings increases the friction, and thus destroys the accuracy of measuring. For this reason the most careful attention has been paid to the construction of meter-bearings, and manufacturers have experimented constantly in the effort to perfect them.

The importance of a bearing in a motor-meter led immediately to the use of jewel-bearings, and these were universally adopted with very good results, the end of the shaft which rests on the jewel being tapered to a sharp point. With such a construction, the thrust being on a hard polished surface, the friction is small and for a time is nearly constant; but the life of the bearing is not as long as is desired. Later it was found that after a period of use the surface of the jewel would become rough under constant operation of the moving element. The wear is very much increased by vibration of the building or support of the meter, which causes a pounding on the jewel step. This suggested the use of a spring to support the jewel to take up jars. With this spring-supported jewel the tapered point of the shaft has been made as hard as possible, and in some cases a separate well-hardened steel pivot has been inserted axially in the end of the shaft. The results of many tests of meters constructed in this manner indicate that for a long period the friction is almost constant, the only increase being due, perhaps, to slight changes of a chemical nature on the surface of the motor-commutator occurring when the meter is first put in use; that after this long period of constant friction the friction begins to increase and from then on increases steadily and rapidly. After this period of increase of the friction it is found that the surface of the jewel is rough, and it must be repolished before the jewel can be used again. The pivot, too, is rough and has been slightly cut away by running on the hard roughened surface of the jewel. It is thought that this action is caused by the jarring and hammering of the moving element, eventually roughening and chipping the surface of the jewel, that the steel point of the shaft becomes charged with minute particles which it chips off of the jewel, and when this occurs the end of the shaft becomes a cutting-tool and roughens the surface of the jewel more rapidly. These tests therefore indicate that the increase in friction after a long period of use of the meter is due to having too hard and rigid a point resting on the jewel and that to prolong the life of the bearing and give constant friction of the smallest magnitude the point should be of a material which cannot injure the jewel. If such a material were used, the jarring of the moving part could not damage the jewel, which could therefore be used for a much longer period without being repolished, and the only effect of long use would be a slow wearing away of the pivot, due to its being continually by running on sapphire. In the effort to produce such a pivot I have experimented with many different materials. Some of these—such, for instance, as a strip of rawhide or fiber secured in the end of the meter-shaft and resting on the jewel—would not damage the jewel; but combined with this requirement the pivot must be of sufficient strength to support the armature and other parts carried by the shaft throughout the jars and vibrations to which they are subjected. For this reason a rawhide or fiber pivot would not lengthen the life of the bearing, as it would become mushroomed under the constant though slight strain. I have also tried many different kinds of wood in the same way, but with unsatisfactory results. There are several materials the use of which as a pivot resting on the jewel of a meter-bearing would meet these requirements and greatly prolong the life of the bearing, and of these I have found ivory to give the best results. This material is tough enough to sustain the weight of the parts carried by the shaft, but it is not hard enough to cause any roughening of the surface of the jewel, and its great elasticity aids in taking up the vibrations of the moving element, thus helping to prevent injury to the jewel. Moreover, the large amount of organic matter in ivory makes such a pivot self-lubricating. Tortoise-shell is like ivory in that it is tough, resilient, and has natural lubricating qualities, due to its being rich in cartilaginous matter, and it would serve as a pivot almost equally as well as ivory. I have also experimented with horn and found that a pivot can be made from that substance. Celluloid, too, and various other compounds having the properties of ivory would give good results; but of all the substances with which I have experimented I prefer to use ivory. The natural lubricating qualities of these substances are of great importance in a pivot; but instead of relying entirely on the natural lubrication of the material I have found it advisable before using the pivots in the meter to soak them in a fine oil—such, for instance, as porpoise-oil—as soaking them in this manner increases to a marked degree their self-lubricating properties. The tests which I have made show that with an ivory pivot the life of the bearing is much more than double that of a bearing having a steel pivot. In addition to the longer life another advantage incident to the use of an ivory or similar pivot is that the wear is solely on the pivot and is only the wear occasioned by the pivot being burnished by running on sapphire. When a steel pivot is used, the wear comes on both the jewel and the pivot, as the jewel is roughened by the constant hammering of the hard pivot, and the pivot is then cut by running on the rough surface of the jewel. On the other hand, if soft steel or other metal be employed sufficient elasticity is lacking, and the tip becomes blunted. It lacks also the self-lubricating property afforded by ivory and other organic materials. Therefore when an ivory or similar pivot is worn off too far to permit of further use the jewel is unaffected and another pivot can be used with the same jewel, whereas with a bearing employing a steel pivot the renewal must include both the pivot and an expensive jewel. Moreover, with an ivory pivot good results are obtained with cheaper jewels than the Ceylon sapphires commonly used or even with a steel cup.

As the ivory or similar pivot wears away slowly by being burnished on the jewel, I effect a further increase in the life of the bearing by making the end of the pivot cylindrical above the small tapered or rounded portion that bears directly on the jewel, so that as the pivot wears away the surface in contact with the jewel always remains the same. This has not been done heretofore for the reason that in jewel-bearings as constructed prior to my invention the pivot becomes useless before it wears away to any extent, as its surface is cut by running on the roughened jewel. With an ivory or similar pivot the surface bearing on the jewel is so much larger than that of the pivots heretofore used that the pivot is quite as strong as is necessary when its cross-section is such that as it wears away by being burnished on the sapphire the area in contact with the jewel always remains the same. The cross-section of the pivot should, in fact, be made a little larger than that which would apparently be required to produce the desired bearing-surface, for the reason that the portion of the bearing-surface of the pivot farthest from its center moves over the jewel more rapidly than the portion nearer the center, and hence is burnished away more rapidly, so that if the body of an ivory pivot were made a little larger than would appear to be required to give the proper bearing-surface the area in contact with the jewel would remain the same throughout the life of the pivot.

My invention therefore comprises a bearing for an electric meter or similar instrument in which the two parts taking the thrust are widely different in the scale of hardness and are of such physical structure as to maintain uniform working relation.

It comprises also a bearing in which one of the parts is much harder than the other; but both are highly elastic.

It comprises also the employment of parts which have great mechanical strength and self-lubricating properties.

It comprises also other more specific features which will be definitely indicated in the appended claims.

Figure 2:
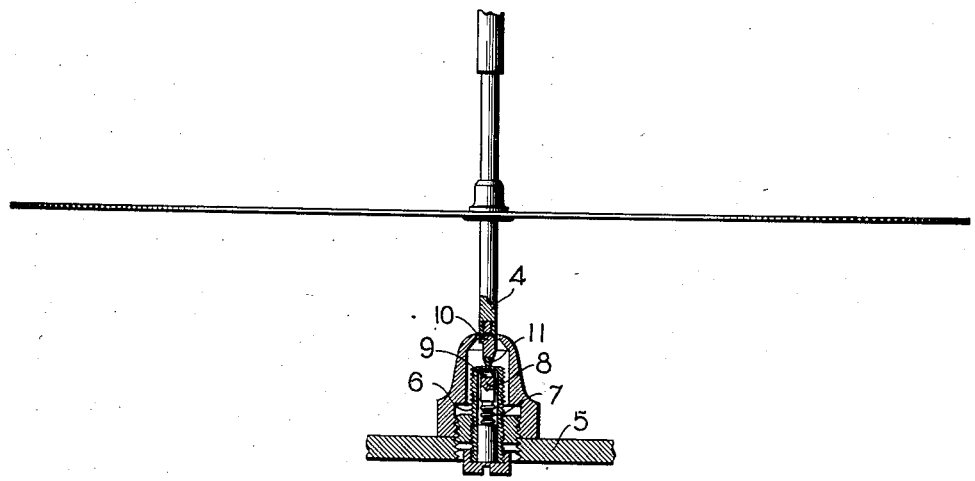
Figure 3:

In the accompanying drawings, which illustrate an embodiment of my invention, Figure 1 represents a meter of ordinary construction, that shown in the drawings being the well-known Thomson recording-wattmeter, having the casing removed. Fig. 2 is an enlarged sectional elevation of the bearing, and Fig. 3 is an enlarged elevation of the end piece for the shaft.

In Fig. 1, 1 represents the field-coils, 2 the armature, 3 the damping-magnets, and 4 the shaft, of a wattmeter. This construction is common and will be readily understood. In Fig. 2, 5 indicates the bottom of the meter in which the hollow jewel-screw 6 is mounted, as shown. Within the hollow screw and supported by a helical spring 7 is the jewel-plug 8, having the jewel 9 set in its upper end.

The end of the shaft 4 is provided with a threaded bore in which the end piece 10 is secured. This end piece is made of brass, so that it can be more readily removed from the end of the shaft, which often becomes magnetized, and to facilitate removal it is flattened on one side, so that it can be gripped by a suitably-shaped tool. In the end of this end piece and axially of the shaft I insert a pivot 11, of ivory or similar material, which is capable of sustaining the weight of the moving parts through all the strains of rough usage and which is resilient and has high natural lubricating qualities, but is not hard enough to damage the jewel on which it rests. The shape of the pivot 11 is clearly shown in Fig. 3. The lower end is slightly tapered or rounded off. Above this rounded portion the pivot is cylindrical, so that as it wears away the area in contact with the jewel always remains the same. The upper end of the pivot is made much larger than the cylindrical portion in order that the pivot may be more rigidly secured to the end piece. This construction not only preserves a uniform working relation between the two parts of the thrust-bearing, thus keeping the friction-load constant, but it greatly lengthens the life of the jewel with respect to all types of friction-bearings heretofore employed.

While the invention has been described in connection with an integrating-wattmeter, this instrument is selected only by way of illustration. The improvements will of course serve equally well in all types of measuring instruments and in thrust-bearings in which the pivot is stationary and the jewel rotates, as well as in those in which the pivot is secured to the shaft and turns on a stationary jewel.

What I claim as new, and desire to secure by Letters Patent of the United States, is—

1. In an electric measuring instrument, a shaft, a pivot secured axially to the end of the shaft, and a jewel on which the pivot rests, said pivot being of a material having natural lubricating qualities.

2. In an electric meter, a shaft, a pivot secured to the end of the shaft axially thereof, and a jewel on which the pivot bears, said pivot being of a material which is highly resilient and self-lubricating.

3. In an electric measuring instrument, a shaft, and a pivot of great elasticity such as ivory secured to the end of the shaft in alinement with its axis.

4. In an electric meter, a shaft, and a pivot secured to the end of said shaft axially thereof, said pivot being of a material such as ivory.

5. In an electric measuring instrument, a shaft, a pivot secured to the shaft in alinement with its axis, said pivot being of a material such as ivory, and a jewel on which the pivot bears.

6. In an electric meter, a shaft, an end piece therefor, and a pivot inserted in said end piece axially of the shaft, said pivot being of a material such as ivory.

7. In an electric meter, a shaft, an end piece therefor, a pivot inserted in said end piece axially of the shaft, said pivot being of a material such as ivory, and a jewel on which said pivot bears.

8. In an electric measuring instrument, a shaft having an ivory pivot.

9. A thrust-bearing for a measuring instrument, having one member a jewel and the other a horn-like substance.

10. A thrust-bearing for a measuring instrument, having one member a jewel and the other an organic, elastic, self-lubricating substance.

11. A thrust-bearing for a measuring instrument, having one member of a very hard substance and the other of a soft, elastic, self-lubricating substance.

12. In an electric measuring instrument, a shaft, a pivot of a soft, elastic substance secured thereto, and a spring-supported jewel on which the pivot bears, said pivot being so shaped that as it wears away the area in contact with the jewel always remains the same.

13. In an electric meter, a shaft, and a bearing therefor, one member of which is a pivot made of a material such as ivory, and the other a cup on which the pivot bears, said pivot being so shaped that as it wears away the area in contact with the cup always remains the same.

In witness whereof I have hereunto set my hand this 10th day of July, 1903.

FREDERICK M. VOGEL.

Witnesses:
 DUGALD McK. McKILLOP,
 JOHN J. WALKER.